United States Patent [19]
Nishiguchi et al.

[11] Patent Number: 5,621,553
[45] Date of Patent: Apr. 15, 1997

[54] LIQUID CRYSTAL DISPLAY DEVICE WITH POLYMER WALL FORMATION RATE IN PERIPHERAL REGION OF DISPLAY SECTION AT LEAST 90%

[75] Inventors: Kenji Nishiguchi, Osaka; Koichi Fujimori, Nabari; Tokihiko Shinomiya, Nara, all of Japan

[73] Assignee: Sharp Kabushiki Kaisha, Osaka, Japan

[21] Appl. No.: 570,961

[22] Filed: Dec. 12, 1995

[30] Foreign Application Priority Data

Dec. 15, 1994 [JP] Japan ................... 6-312008

[51] Int. Cl.⁶ .................... G02F 1/1339; G02F 1/13
[52] U.S. Cl. .................... 349/153; 349/156; 349/187
[58] Field of Search .................... 359/51, 80, 81

[56] References Cited

U.S. PATENT DOCUMENTS

| | | | |
|---|---|---|---|
| 4,640,583 | 2/1987 | Hoshikawa et al. | 359/80 |
| 5,335,103 | 8/1994 | Kim | 359/80 |
| 5,450,220 | 9/1995 | Onishi et al. | 359/51 |
| 5,473,450 | 12/1995 | Yamada et al. | 359/51 |
| 5,490,001 | 2/1996 | Konuma | 359/81 |
| 5,499,128 | 3/1996 | Hasegawa et al. | 359/81 |
| 5,517,344 | 5/1996 | Hu et al. | 359/80 |
| 5,535,026 | 7/1996 | Fujimori et al. | 359/81 |
| 5,539,545 | 7/1996 | Shimizu et al. | 359/81 |
| 5,546,208 | 8/1996 | Shimizu et al. | 359/81 |
| 5,552,913 | 9/1996 | Shimizu et al. | 359/80 |

FOREIGN PATENT DOCUMENTS

| | | | |
|---|---|---|---|
| 58-501631 | 9/1983 | Japan . | |
| 59-116717 | 7/1984 | Japan | 359/80 |
| 60-101520 | 6/1985 | Japan | 359/80 |
| 60-146228 | 8/1985 | Japan | 359/80 |
| 61-215524 | 9/1986 | Japan . | |
| 63-137213 | 6/1988 | Japan . | |
| 5-107545 | 4/1993 | Japan | 359/80 |
| 6-301015 | 10/1994 | Japan . | |
| 2183073 | 5/1987 | United Kingdom | 359/80 |
| WO83/01016 | 3/1983 | WIPO . | |

*Primary Examiner*—Anita Pellman Gross
*Attorney, Agent, or Firm*—Nixon & Vanderhye P.C.

[57] ABSTRACT

The liquid crystal display device of this invention, includes: a pair of substrates, at least one of which is transparent; and a liquid crystal layer including a plurality of polymer walls and liquid crystal regions surrounded by the plurality of polymer walls and being interposed between the pair of substrates, wherein each substrate includes a display section having a plurality of electrodes for display at a side adjacent to the liquid crystal layer and a non-display section provided around the display section, and wherein a polymer wall formation rate in the peripheral region of the display section is 90% or more.

18 Claims, 4 Drawing Sheets

LIQUID CRYSTAL DISPLAY DEVICE WITH POLYMER WALL FORMATION RATE IN PERIPHERAL REGION OF DISPLAY SECTION AT LEAST 90%

BACKGROUND OF THE INVENTION

1. Field of the Invention

The present invention relates to a liquid crystal device which can be used, for example, in a portable information terminal having a pen based input, OA equipment such as a television, or a display having a wide viewing angle, and to a method for producing the same. More particularly, the present invention relates to a liquid crystal display device including a liquid crystal region surrounded by a polymer wall which operates a twisted nematic (TN) mode, a super twisted nematic (STN) mode, an electrically controlled birefringence (ECB) mode, a ferroelectric liquid crystal (FLC) display mode, a light scattering mode or the like; and a method for producing the same.

2. Description of the Related Art

Nowadays, various kinds of display modes have been employed for a liquid crystal display (LCD) device. For example, LCDs for providing a display in a twisted nematic (TN) mode or a super twisted nematic (STN) mode using nematic liquid crystal molecules are practically used as LCDs utilizing electrooptic characteristics for performing a display. In addition, LCDs utilizing ferroelectric liquid crystal material can be put into practical use.

Moreover, a mode for electrically controlling a transparent state and a scattering state of a liquid crystal material by the use of birefringence of the liquid crystal material has recently been proposed in, for example, Japanese Laid-Open National Patent Publication No. 58-501631. In an LCD operating in accordance with this mode, a display medium in which liquid crystal droplets are dispersed in a polymer is interposed between a pair of substrates opposed to each other. This type of LCD is called a polymer dispersed liquid crystal (PDLC) display device. In a PDLC display device, a display is performed in the following manner. When a voltage is applied to the liquid crystal layer, the orientations of the liquid crystal molecules are aligned towards the direction of the electric field. As a result, the ordinary refractive index of the liquid crystal molecules is matched with the refractive index of the polymer serving as a support medium, whereby a transparent state is obtained. On the other hand, when no voltage is applied to the liquid crystal layer, the random orientations of the liquid crystal molecules cause light scattering, whereby an opaque state is obtained. By controlling orientations of liquid crystal molecules between the transparent state and the opaque state, display can be performed.

According to a method for producing the above-mentioned PDLC display device, the liquid crystal droplets are formed by utilizing the phase-separation between the polymer and the liquid crystal material. Thus, the shapes and size of the liquid crystal droplets are not uniform, and it is difficult to precisely control arrangements of the liquid crystal droplets in a direction along the surface of the substrates. Consequently, different driving voltages are required to be applied to the respective liquid crystal droplets to degrade the steepness of the threshold value exhibiting the electrooptic characteristics, resulting in a relatively high driving voltage.

In order to solve the problems of the above-mentioned conventional PDLC display device, Japanese Laid-Open Patent Publication No. 6-301015 assigned to the same assignee of the present application discloses a new display mode using an improved PDLC display device. In preparation of this LCD, ultraviolet rays are radiated onto the mixture of a liquid crystal material and a photopolymerizable compound through a photomask and the like so that some regions are irradiated with relatively intense light and other regions are irradiated with relatively weak light. As a result, the polymer is aggregated in the regions irradiated with the relatively intense light to form polymer walls, while the liquid crystal material is aggregated in the regions irradiated with the relatively weak light to form a liquid crystal region. According to this method, liquid crystal droplets can be uniformly formed in shape and size. Also, it is possible to precisely control the arrangement of liquid crystal droplets, i.e., pixels, in a direction along a surface of the substrate.

In the above-mentioned liquid crystal display device, the substrate includes: a display section in which transparent electrodes made of a material for reducing the amount of UV rays to be transmitted such as ITO (Indium Tin Oxide) is formed; and a terminal section (a non-display section) formed around the display section. Polymer walls are formed between the adjacent transparent electrodes, and between transparent electrodes of two opposed substrates and the terminal region. An overlapped region of the electrodes formed on the substrates opposed to each other serves as a pixel. Typically, a distance between the pixel in the periphery of the display section and the end portion of the substrate is larger than that between pixels in the display section. Therefore, in the boundary region between the display section and the non-display section, there are necessarily some large UV ray irradiated areas and other smaller UV irradiated areas. For example, in the corner of the display section, a distance between the pixel present at the corner and the pixel adjacent thereto is smaller than a distance between these pixels and the end portion of the substrate. Therefore, the area irradiated with UV rays in the latter case is larger than that in the former case.

Generally, the polymerization of the photopolymerizable compound occurs more easily in the large area irradiated with UV rays than in the small area. Thus, the polymerization more rapidly proceed in the region between the end portion of the substrate than in the region between pixels in the boundary region between the display section and the non-display section. With the polymerization of photopolymerizable compounds, since a large amount of the photopolymerizable compound is converted to a polymer in the region between the pixel and the end portion of the substrate, photopolymerizable compounds migrate from the region between pixels to the region between the pixel and the end portion of the substrate, decreasing a concentration of the polymerizable compound in the region between pixels. Furthermore, some polymers produced in the region between pixels also migrate from the region between pixels to the region between the pixel and the end portion of the substrate, resulting in poor formation of polymer walls in the region between pixels.

As a result, a ratio of polymer walls and liquid crystal regions in the peripheral region of the display section differs from that in the central region of the display section. The amount of light transmitted through the liquid crystal region and the polymer wall, which have different refractive indices, in the peripheral region of the display section differs from that in the central region of the display section. In this way, since the amount of transmitted light in the peripheral region of the display section differs from that in the central region of the display section, the tone obtained in the peripheral region is different from that obtained in the central region. Thus, a conventional liquid crystal display device is disadvantageous in that it is difficult to obtain uniform display over the entire display region.

Japanese Laid-Open Patent Publication Nos. 61-215524 and 63-137213 disclose a method for increasing the reliability of a panel by adhering a pair of substrates using a two-layered structure sealing material or for enhancing the panel strength so as to reduce unevenness of a gap between the substrates. However, the above-mentioned sealing material having the two-layered structure has not been used for the purpose of enhancing display quality of a liquid crystal display device by preventing migration of photopolymerizable compounds and polymers from the region between pixels to the region between the pixel and the end portion of the substrate.

SUMMARY OF THE INVENTION

The liquid crystal display device of this invention, includes: a pair of substrates, at least one of which is transparent; and a liquid crystal layer including a plurality of polymer walls and liquid crystal regions surrounded by the plurality of polymer walls and being interposed between the pair of substrates, wherein each substrate includes a display section having a plurality of electrodes for display at a side adjacent to the liquid crystal layer and a non-display section provided around the display section, and wherein a polymer wall formation rate in the peripheral region of the display section is 90% or more.

In a preferred embodiment of this invention, a shielding layer for reducing the amount of UVs ray to be transmitted is provided on at least one surface of at least one substrate in the non-display section.

In a preferred embodiment of this invention, a sealing material is provided on a non-display section side in a boundary region between the display section and the non-display section.

In a preferred embodiment of this invention, the sealing material has a double structure having an inner seal and an outer seal, the inner seal is provided in the boundary region between the display section and the non-display section, and the outer seal is provided in the non-display section.

In a preferred embodiment of this invention, a liquid crystal material is injected between the inner seal and the outer seal.

In a preferred embodiment of this invention, a width of the inner seal is the range of 50 µm to 2 mm.

In a preferred embodiment of this invention, a plurality of further electrodes having a shape similar to those formed in the display section are formed in the non-display section.

In a preferred embodiment of this invention, the electrodes are formed in at least three pixel rows.

The method for producing a liquid crystal display device includes the steps of: attaching a pair of substrates, at least one of which is transparent, to each other, each substrate including a display section having a plurality of electrodes for display and a non-display section provided around the display section so that surfaces of the substrates on which the electrodes are respectively formed face each other; sealing a mixture of a photopolymerizable composition and a liquid crystal material between the pair of substrates; irradiating the mixture with light having different irradiation intensity between the display section and the non-display section and significantly varying irradiation intensity in the display section to photopolymerize the mixture so as to form polymer walls and liquid crystal regions.

In a preferred embodiment of this invention, a shielding layer for reducing the amount of UV light to be transmitted is provided on at least one surface of at least one substrate in the non-display section.

In a preferred embodiment of this invention, a sealing material is provided on the non-display section side in a boundary region between the display section and the non-display section.

In a preferred embodiment of this invention, the sealing material has a double structure having an inner seal and an outer seal, the inner seal is provided in the boundary region between the display section and the non-display section, and the outer seal is provided in the non-display section.

In a preferred embodiment of this invention, a liquid crystal material is injected between the inner seal and the outer seal.

In a preferred embodiment of this invention, a width of the inner seal is the range of 50 µm to 2 mm.

In a preferred embodiment of this invention, a plurality of further electrodes having a shape similar to those formed in the display section are formed in the non-display section.

In a preferred embodiment of this invention, the electrodes are formed in at least three pixel rows.

Thus, the invention described herein makes possible the advantages of: (1) providing a liquid crystal display device with reduced unevenness of tone by reducing poor formation of polymer walls over the entire display section to improve display quality; and (2) providing a method for producing a liquid crystal display device capable of reducing poor formation of polymer walls over the entire display section so as to reduce evenness of tone and improve display quality.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described with reference to FIGS. 1 through 5. However, the present invention is not limited thereto. In the present specification, the term "a liquid crystal region" refers to a space which includes a liquid crystal material and is surrounded by a polymeric material.

The term "a polymer wall" refers to a polymeric material which separates a liquid crystal region from neighboring liquid crystal regions.

The term "polymer wall formation rate" refers to a ratio of pixels where four contiguous polymer walls surrounding a pixel are successively formed to all pixels in three pixel rows at the peripheral region of the display section A.

The term "pixel row" refers to an arrangement of pixels along the boundary region between the display section and non-display section. The first pixel row is adjacent to the boundary region, the second pixel row is neighboring to the first pixel row and the third pixel row is neighboring to the second row. When pixel rows are in the display section, the third pixel row includes the nearest pixel to a center of the display section in pixels of three pixel rows on a diagonal line of the display section.

EXAMPLE 1

Figure 1:
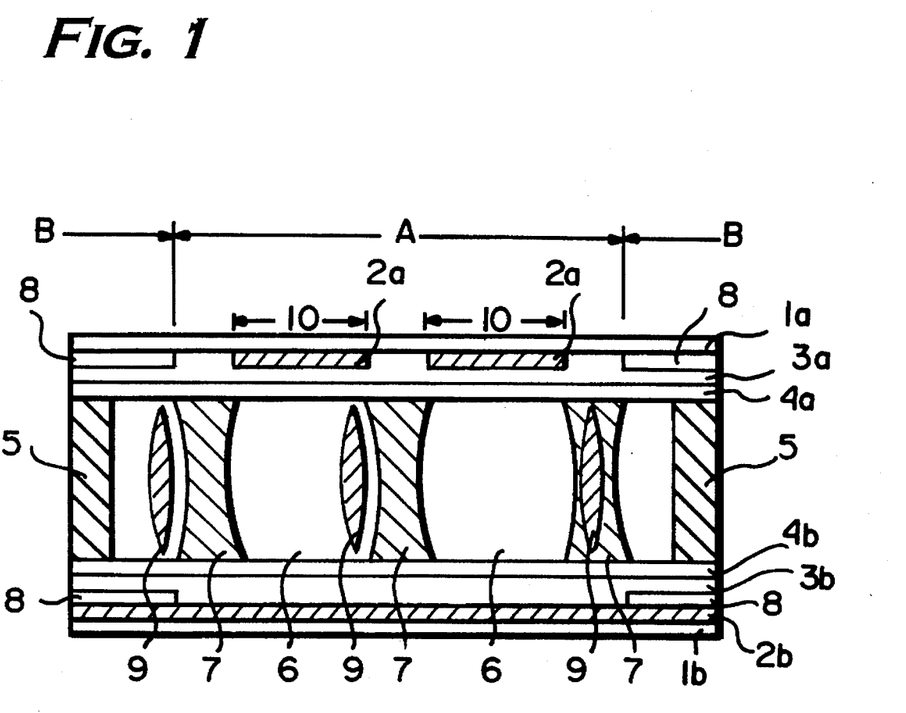
FIG. 1 is a cross-sectional view showing the configuration of a liquid crystal display device according to Example 1 of the present invention.

FIG. 1 is a cross sectional view showing the configuration of a liquid crystal display device according to Example 1 of the present invention. The liquid crystal display device shown in FIG. 1 includes a pair of substrates 1a and 1b facing each other and a display medium interposed therebetween. The display medium includes polymer walls 7 and liquid crystal regions 6. The polymer walls 7 and the liquid crystal regions 6 are formed by phase-separation. A plurality of strip-shaped transparent electrodes 2a for display are formed at predetermined intervals on the surface of the substrate 1a so as to face the display medium. A plurality of strip-shaped transparent electrodes 2b for display are formed at predetermined intervals on the surface of the substrate 1b facing the display medium so as to cross the electrodes 2a. Furthermore, a shielding layer 8 for reducing the amount of ultraviolet rays transmitted therethrough is formed on the ends of the substrates 1aand the transparent electrodes 2a. Similarly, a shielding layer 8 for reducing the amount of UV light transmitted therethrough is formed on the ends of the substrate 1b and the transparent electrodes 2b. An electrically insulating film 3a is formed so as to cover the substrate 1a, the transparent electrodes 2a and the shielding layer 8. Similarly, an electrically insulating film 3b is formed so as to cover the substrate 1b, the transparent electrode 2b and the shielding layer 8. Furthermore, alignment films 4a and 4b are formed on the electrically insulating film 3a and 3b, respectively. A region interposed between the transparent electrodes 2a and 2b facing each other serves as a pixel section 10. The pixel section 10 is included in the liquid crystal region 6. Furthermore, both ends of the display medium are sealed with a sealing material 5 so that the pair of substrates 1a and 1b face each other interposing a predetermined distance therebetween. Spacers 9 serving as substrate gap controlling materials are dispersed in gaps between the pair of substrates.

The liquid crystal display device according to Example 1 is characterized in that the shielding layers 8 are formed on the surfaces of the substrates in the end portions of the substrates so as to face the display medium. The end portions of the substrates are referred to collectively as a non-display section B and correspond to a region at least between a display section A and the sealing material 5. In the display section A, a plurality of regions where the transparent electrodes 2a and 2b cross each other, i.e., pixels 10, are present. The non-display section B corresponds to a peripheral region of the display section A, and includes a region where the sealing material 5 for attaching the pair of substrates to each other is provided.

As described above, the shielding layers 8 for reducing the amount of transmitted ultraviolet rays are provided in the non-display section B. As a result, the amount of ultraviolet rays radiated into the non-display section B can be reduced so as to inhibit the polymerization of a photopolymerizable compound in the non-display section B. Thus, a polymer or a photopolymerizable compound is prevented from flowing into the non-display section B from the display section A.

The liquid crystal display device according to Example 1 described above can be fabricated, for example, as follows.

First, ITO films are respectively formed on the substrates 1a and 1b to a thickness of 2000 angstroms by sputtering or the like so as to form the strip-shaped transparent electrodes 2a and 2b at predetermined intervals. Next, the shielding films 8 are formed in the peripheral regions of the display sections A (i.e., non-display sections B) using metal films made of Mo, Cr, Ni, Cu, Al or the like or inorganic films made of $SiO_2$ or ITO for reducing the amount of transmitted ultraviolet rays. Furthermore, the electrically insulating films 3a and 3b are respectively formed thereon so as to cover the shielding films 8. Then, the alignment films 4a and 4b are formed on the electrically insulating films 3a and 3b. The alignment films 4a and 4b are rubbed with a nylon cloth.

As a material of the substrates, any material can be used as long as at least one substrate is made of a transparent material capable of transmitting light. For example, a glass substrate, a plastic film or the like can be used. Moreover, one substrate may be opaque and may be provided with a metal film or the like as long as the other substrate is transparent. It is sufficient to form the shielding films 8 so as to cover at least a region between the sealing materials 5 and the display section A. However, the shielding films 8 may be formed so as to cover the entire non-display section B including the regions where the sealing materials 5 are provided. Furthermore, the alignment films 4a and 4b are formed as they are needed. If the alignment films 4a and 4b are not necessary, they may be omitted.

The thus formed substrates 1a and 1b are disposed so that the transparent electrodes 2a and 2b are orientated perpendicular to each other. The spacers 9 are dispersed in gaps between the substrates 1a and 1b. Then, both ends of the substrates are attached by the sealing material 5, thereby completing a liquid crystal cell.

A mixed material containing at least a liquid crystal material, a photopolymerizable compound and a photopolymerization initiator (hereinafter, referred to as a mixed liquid crystal material) is injected into gaps of the thus produced liquid crystal cell. As the liquid crystal material, any liquid crystal material which is conventionally used for a liquid crystal display device operating in a TN mode, a STN mode, an ECB mode, a ferroelectric liquid crystal mode, a light scattering mode or the like can be used. For example, in the case where a liquid crystal display device performs a display in an STN display mode, XL1-4427 (fabricated by Merk & Co., Inc) to which a chiral agent (S-811) is added at 0.3% can be used. As the photopolymerizable compound, p-phenylstyrene, isobornyl methacrylate, perfluoroalkyl methacrylate, or a combination thereof can be used. As the photopolymerization initiator, Irugacure 651 (fabricated by CHIBAGAIGY CO., LTD) can be used, for example. During this procedure, an injection opening is sealed with a UV curable resin so that the display section A is not irradiated with light in the following UV irradiation process.

Next, the mixed liquid crystal material is irradiated with UV light having a distribution of intensity over the display section A by a photomask or the like from the exterior of the liquid crystal cell. A high-pressure mercury lamp for radiating UV light, with which collimated light beams can be obtained, is used as a light source. The irradiation intensity of the high-pressure mercury lamp is, for example, 10 mW/cm$^2$. A temperature of the substrate during UV ray irradiation may be set at room temperature. Alternatively, a temperature of the substrate during UV ray irradiation may be set at a temperature at which liquid crystal molecules are in an anisotropic liquid crystal state between the substrates. In this case, the orientation of liquid crystal molecules can be stabilized. By radiating UV light onto the mixed liquid crystal material, the polymer and the liquid crystal material are separated from each other in different phases. As a result, liquid crystal regions 6 are formed in regions irradiated with weak light in the display section A while polymer walls 7 are formed in regions irradiated with intense light in the display section A. At this time, the photopolymerizable compound is inhibited from being polymerized since UV light are shielded by the shielding layers 8 so as not irradiate the non-display section B. Thus, it is possible to prevent a polymer or a photopolymerizable compound from flowing into the non-display section B from the display section A.

In the case where UV irradiation is performed at high temperature so as to stabilize the orientation of liquid crystal molecules, it is preferred that the liquid crystal cell be cooled to room temperature in a cooling oven. A cooling speed is preferably in the range of 3° C./h to 20° C./h, and more preferably, 5° C./h to 10° C./h. The unreacted photopolymerizable compound may be cured by irradiating the entire substrate with weak ultraviolet rays at room temperature again after the mixed liquid crystal material is separately formed into the polymer walls and the liquid crystal regions, if necessary. At this time, although a PDLC type wall or a polymer wall is formed in the region other than the display section A (i.e., non-display section B), the polymer in the display section which is separated into two different phases does not flow into the non-display section B since it already has been cured. Therefore, the liquid crystal regions 6 and the polymer walls 7 of the display section A are not affected thereby.

A polymer wall formation rate in the periphery of the display regions of the thus produced liquid crystal display device is shown in Table 1 below. For comparison, a conventional liquid crystal display device, in which the shielding layers 8 are not provided, is also shown in Table 1 as a Comparative Example.

TABLE 1

|  | Example 1 | Comparative Example |
|---|---|---|
| Polymer wall formation rate (%) | 98.4 | 50.4 |

As can be seen from Table 1 above, the liquid crystal display device according to Example 1 is capable of reducing poor formation of the polymer wall in the periphery of the display section A adjacent to the non-display section B.

EXAMPLE 2

Figure 2A:
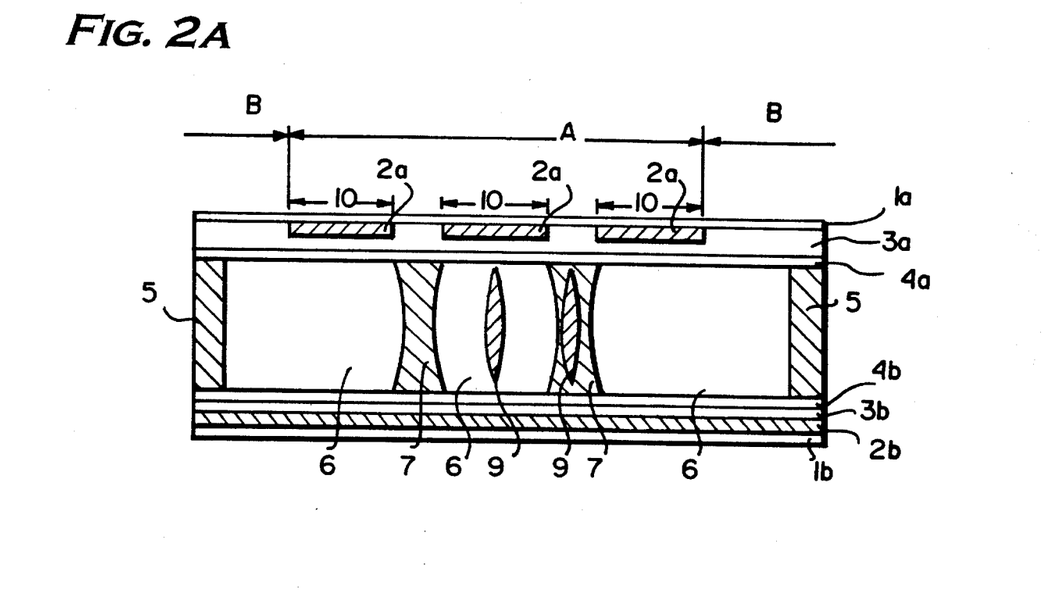
FIG. 2A is a cross-sectional view showing the configuration of a liquid crystal display device according to Examples 2 and 3.

A liquid crystal display device in Example 2, as represented in FIG. 2A, differs from that in Example 1 in that the shielding layers 8 for reducing the amount of UV light to be transmitted are provided on the outer surface of one of the substrates 1a and 1b. The liquid crystal material and the photopolymerizable compound are the same as those used in Example 1. The configuration of the liquid crystal display device is the same as that is Example 1 except that the shielding layers 8 are not provided onto the surfaces of the substrates 1a and 1b so as to face the display medium.

The liquid crystal display device according to Example 2 can be fabricated, for example, as follows.

First, a mixed liquid crystal material such as that in Example 1 is injected into the liquid crystal cell fabricated in the same process as that of Example 1 except that the shielding layers 8 are not formed. Then, an injection opening is sealed.

Next, UV light having a distribution of intensity over the display section A by a photomask or the like is radiated into the mixed liquid crystal material from the outside of the liquid crystal cell. The light source and the irradiation intensity of the source are the same as those in Example 1. UV ray irradiation is performed while a photomask (a shielding layer 8) or the like is placed on the non-display section B on the externally exposed side of the substrate. It is sufficient that the shielding layer 8 is formed so as to cover at least a region between the sealing material 5 and the display section A. However, the shielding layer 8 may be formed on the entire non-display section B. A substrate temperature during UV ray irradiation may be set at room temperature or a temperature at which liquid crystal molecules are in an anisotropic liquid crystal state between the substrates. The phase separation between the polymer and the liquid crystal is caused by UV ray irradiation, thereby forming the liquid crystal regions 6 in regions irradiated with weak light in the display section a and the polymer walls 7 in regions irradiated with intense light in the display section A. The phase separation is insufficiently caused in the region covered with the photo mask, resulting in a mixture containing at least a liquid crystal material and a photopolymerizable compound to be left. Since the non-display section B is prevented from being irradiated with UV light by the photomask, polymerization of the photopolymerizable compound is inhibited. Thus, the polymer or the photopolymerizable compound is prevented from flowing into the non-display section B from the display section A.

In the case where UV irradiation is performed at high temperature so as to stabilize the orientation of liquid crystal molecules, it is preferred that the liquid crystal cell be cooled to room temperature in a cooling oven after UV irradiation as in Example 1. A cooling speed is preferably in the range of 3° C./h to 20° C./h, and more preferably, 5° C./h to 10° C./h. After the phase separation is caused in this way, an unreacted photopolymerizable compound may be cured by radiating UV light onto the entire substrate at weak intensity at room temperature again, if necessary. If UV ray re-irradiation is performed, a PDLC wall or a polymer wall is formed in the region outside the display section A (i.e., the non-display section B). Since, the polymer in the non-display section A, which are already separated into the polymer walls and the liquid crystal regions, have been already cured, the polymer does not flow into the non-display section B. Therefore, as in Example 1, the liquid crystal regions 6 and the polymer walls 7 of the display section A are not affected.

A polymer wall formation rate in the periphery of the display regions of the thus produced liquid crystal display device according to Example 2 is shown in Table 2 below. For comparison, a conventional liquid crystal display device, in which the photomask is not formed in the non-display section B, is also shown in Table 2 as a Comparative Example. In Table 2, the polymer wall formation rate represents a rate at which four contiguous polymer walls surrounding a pixel is successfully formed in the polymer walls surrounding the pixels in three columns adjacent to the non-display section B (the pixels from the end of the display sections A to the third circuit).

TABLE 2

|  | Example 2 | Comparative Example |
|---|---|---|
| Polymer wall formation rate (%) | 97.6 | 50.4 |

As can be seen from Table 2 above, the liquid crystal display device according to Example 2 is capable of reducing poor formation of the polymer wall in the periphery of the display section A adjacent to the non-display section B.

EXAMPLE 3

A liquid crystal display device in Example 3, as also represented in FIG. 2A, differs from that in Example 1 in that the shielding layers 8 for reducing the amount of UV light to be transmitted are externally provided on the liquid cell. The liquid crystal material and the photopolymerizable compound are the same as those used in Example 1. The configuration of the liquid crystal display device is the same as that in Example 1 as shown in FIG. 2A except that the shielding layers 8 are not provided onto the surfaces of the substrates 1a and 1b facing the display medium.

The liquid crystal display device according to Example 3 can be fabricated, for example, as follows.

First, the same mixed liquid crystal material as that in Example 1 is injected into the liquid crystal cell fabricated in the same process as that of Example 1 except that the shielding layers 8 are not formed. Then, an injection opening is sealed.

Figure 2B:
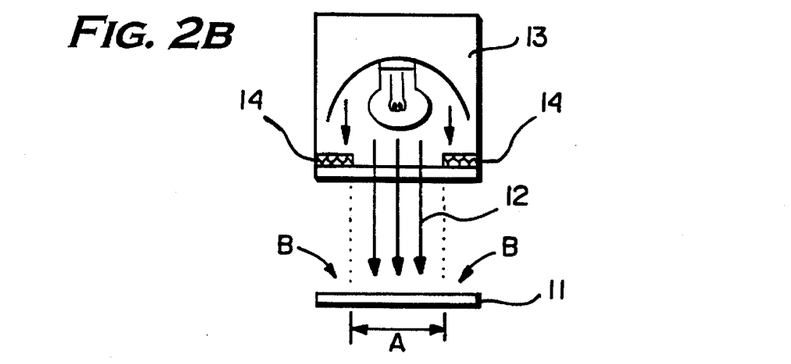
FIG. 2B is a diagram showing the ultraviolet ray irradiation process in the fabrication of a liquid crystal display device according to Example 3.

Next, UV light having a distribution of intensity over the display section A by a photomask or the like is radiated into the mixed liquid crystal material from the outside of the liquid crystal cell. The light source and the irradiation intensity of the source are the same as those in Example 1. However, as shown in FIG. 2B, UV ray irradiation is performed while a mask 14 is provided for a UV ray irradiation lamp 13 so that the non-display section B of a liquid crystal cell 11 is not irradiated with UV light 12. A substrate temperature during UV ray irradiation may be set at room temperature or a temperature at which liquid crystal molecules are in an anisotropic liquid crystal state between the substrates. The phase separation between the polymer and the liquid crystal is caused by UV ray irradiation, whereby the liquid crystal regions 6 are formed in the region irradiated with weak light and the polymer walls 7 are formed in the region irradiated with intense light within the display section A. Since the non-display section B of the liquid crystal cell 11 is prevented from being irradiated with the UV light 12 by the mask 14, the polymerization of the photopolymerizable compound is prevented. As a result, a mixture containing at least a liquid crystal material and a photopolymerizable compound is left uncured. Thus, the polymer or the photopolymerizable compound is prevented from flowing into the non-display section B from the display section A.

In the case where UV irradiation is performed at high temperature so as to stabilize the orientation of liquid crystal molecules, it is preferred that the liquid crystal cell is cooled to room temperature in a cooling oven after UV irradiation as in Example 1. A cooling speed is preferably in the range of 3° C./h to 20° C./h, and more preferably, 5° C./h to 10° C./h. After the phase separation is performed, an unreacted photopolymerizable compound may be cured by radiating UV light onto the entire substrate at weak intensity at room temperature again, if necessary. If UV ray re-irradiation is performed, a PDLC wall or a polymer wall is formed in the region outside the display sections A (i.e., the non-display sections B). However, the polymer in the non-display sections A, which have been already separated into the polymer walls and the liquid crystal regions, are already cured, the polymer does not flow into the non-display sections B. Therefore, the liquid crystal regions 6 and the polymer walls 7 of the display sections A are not affected as in Example 1.

A polymer wall formation rate in the periphery of the display regions of the thus produced liquid crystal display device according to Example 3 is shown in Table 2 below. For comparison, a conventional liquid crystal display device, in which the UV irradiation lamp is not provided with a mask, is also shown in Table 3 as a Comparative Example.

TABLE 3

|  | Example 3 | Comparative Example |
|---|---|---|
| Polymer wall formation rate (%) | 97.5 | 50.4 |

As can be seen from Table 3 above, the liquid crystal display device according to Example 3 is capable of reducing poor formation of the polymer wall in the periphery of the display section A adjacent to the non-display section B.

EXAMPLE 4

Referring to FIGS. 3A–3D, a liquid crystal material and a photopolymerizable compound in Example 4 are the same as those used in Example 1. The configuration of a liquid crystal display device according to Example 4 is same as that of Example 2 except that a sealing material 21 is provided in the boundary regions between the display section A and the non-display section B as shown in FIGS. 3A through 3D.

The liquid crystal display device according to Example 4 can be fabricated, for example, as follows.

Figure 3A:
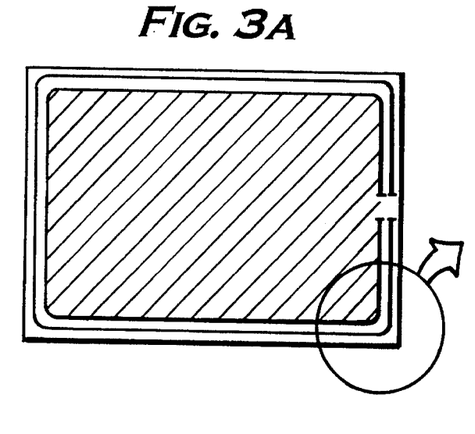
FIG. 3A is a plan view showing the arrangement of a sealing material in a liquid crystal display device according to Example 4 of the present invention.
Figure 3B:
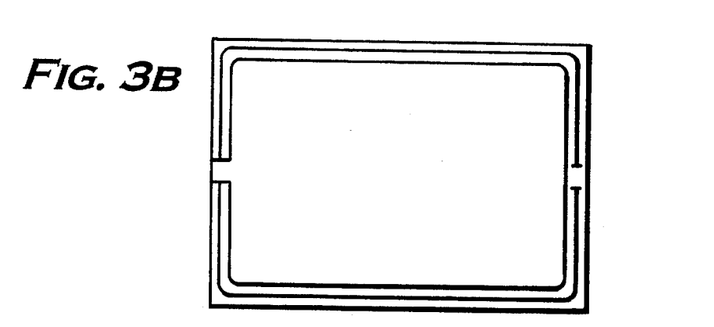
FIG. 3B is a plan view showing a substrate having a double-layered seal pattern.
Figure 3C:
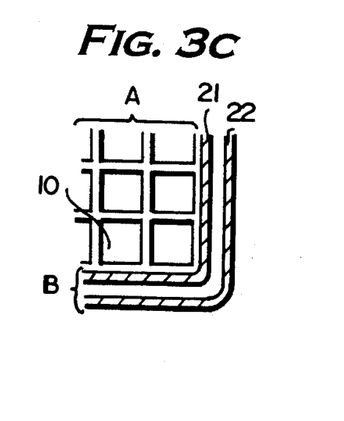
FIG. 3C is an enlarged view of an angular portion shown in FIG. 3A.

First, the shielding layers 8 are omitted, and the sealing material 5 is provided in the boundary regions between the display sections A and the non-display section B in the liquid crystal display device according to Example 4. A sealing material 22 may be provided in the non-display section B in the outer periphery of the boundary region, if necessary. If the sealing material 22 is further provided, a double seal serves to increase the panel strength. Therefore, pressure-resistance against a pushing force applied in the case of, for example, data input with a pen, can be increased. A liquid crystal material may be injected into gaps between the sealing materials 21 and 22 so that the gap regions serve as display regions. If a substrate having a seal pattern as shown in FIG. 3B is used, it becomes possible to inject a liquid crystal material which does not contain the photopolymerizable compound into the double seals, for example. Moreover, it is possible to inject different liquid crystal materials into the display sections and the region between double seals. If a width of the sealing material 21 serving as a inner seal is set in the range of 50 µm to 2 mm, the sealing material will obtain such strength that the panel is not destroyed by vacuum injection. Thus, it is possible to render the sealing material 21 serving as the inner seal less conspicuous in a display. The liquid crystal cell is produced in the same process as that of Example 1 except the above conditions. The same mixed liquid crystal material as that in Example 1 is injected into the liquid crystal cell, and then, the injection opening thereof is sealed.

Figure 3D:
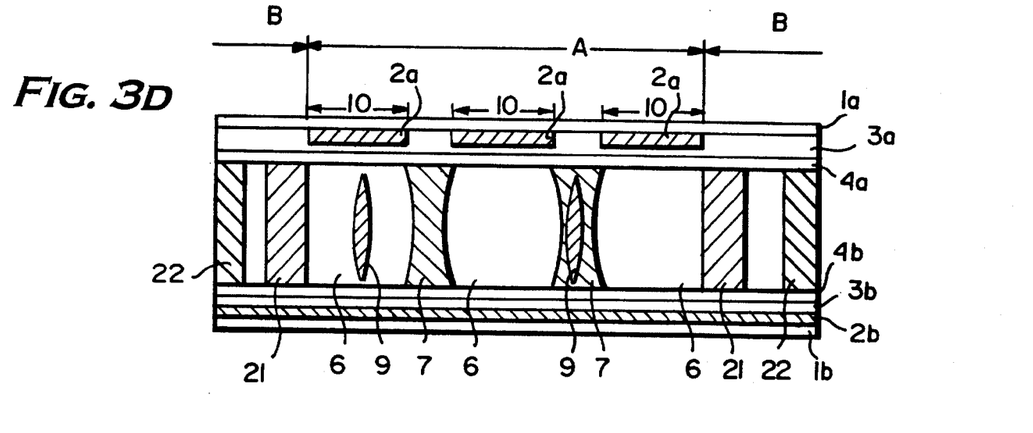
FIG. 3D is a cross-sectional view showing the configuration of the liquid crystal display device shown in FIG. 3A.

Next, UV light having a distribution of intensity over the display section A by a photomask or the like is radiated into the mixed liquid crystal material from the outside of the liquid crystal cell. The light source and the irradiation position are the same as those in Example 1. A substrate temperature during UV ray irradiation may be set at room temperature or a temperature at which liquid crystal molecules are in an anisotropic liquid crystal state between the substrates. The phase separation between the polymer and the liquid crystal is caused by UV ray irradiation, thereby forming the liquid crystal regions 6 in the region irradiated with weak light and the polymer walls 7 in the region irradiated with intense light within the display section A. In this phase separation process, since the inner seal 21 is formed in the boundary region between the display section A and the non-display section B, the polymer or the photopolymerizable compound is prevented from flowing into the non-display section B from the display section A.

In the case where UV irradiation is performed at high temperature so as to stabilize the orientation of liquid crystal molecules, it is preferred that the liquid crystal cell be cooled to room temperature in a cooling oven after UV irradiation as in Example 1. A cooling speed is preferably in the range of 3° C./h to 20° C./h, more preferably, 5° C./h to 10° C./h. After the phase separation is performed in this way, an unreacted photopolymerizable compound may be cured by radiating UV light onto the entire substrate at weak intensity at room temperature again, as needed.

A polymer wall formation rate in the periphery of the display regions of the thus produced liquid crystal display device according to Example 4 is shown in Table 4 below. For comparison, a conventional liquid crystal display device, in which the inner seal is not formed, is also shown in Table 4 as a Comparative Example.

TABLE 4

|  | Example 4 | Comparative Example |
|---|---|---|
| Polymer wall formation rate (%) | 98.8 | 50.4 |

As can be seen from Table 4 above, the liquid crystal display device according to Example 4 is capable of reducing poor formation of the polymer wall in the periphery of the display section A adjacent to the non-display section B.

EXAMPLE 5

Figure 4:
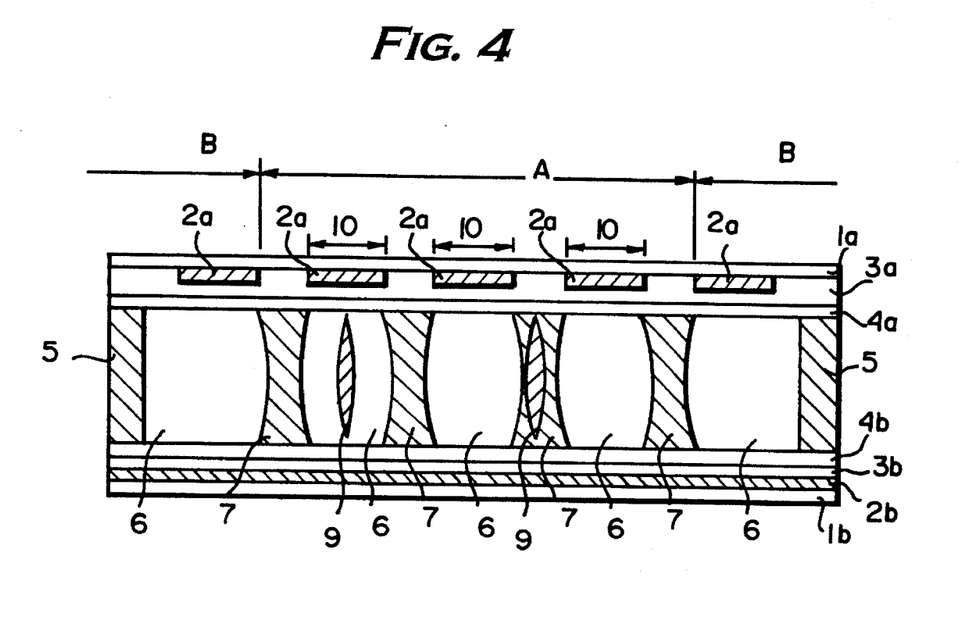
FIG. 4 is a cross-sectional view showing the configuration of a liquid crystal display device according to Example 5 of the present invention.

In Example 5, a liquid crystal material and a photopolymerizable compound are the same as those used in Example 1. The configuration of a liquid crystal display device according to Example 5, as represented in FIG. 4, is the same as that in Example 2 except that electrodes having the same shape as those formed in the display section A are further formed in the non-display section B.

The liquid crystal display device according to Example 5 can be fabricated, for example, as follows.

First, a liquid crystal cell is fabricated by the same procedure as that of Example 1 except that the shielding layers 8 are not provided and electrodes having the same configuration as those of the display section A are further formed in the non-display section B. A mixed liquid crystal material is injected into the liquid crystal cell, and then an injection opening is sealed.

Next, UV light having a distribution of intensity over the display section A are radiated into the mixed liquid crystal material from the outside of the liquid crystal cell. The light source and the irradiation intensity of the source are the same as those in Example 1. A substrate temperature during UV ray irradiation may be set at room temperature or a temperature at which liquid crystal molecules are in an anisotropic liquid crystal state between the substrates as in Example 1. The phase separation between the polymer and the liquid crystal is caused by UV ray irradiation, thereby forming the liquid crystal regions 6 in the region irradiated with weak light and the polymer walls 7 irradiated with intense light within the display section A.

In the case where UV irradiation is performed at high temperature so as to stabilize the orientation of liquid crystal molecules, it is preferred that the liquid crystal cell be cooled to room temperature in a cooling oven after UV irradiation as in Example 1. A cooling speed is preferably in the range of 3° C./h to 20° C./h, more preferably, 5° C./h to 10° C./h. After the phase separation is performed, an unreacted photopolymerizable compound may be cured by radiating UV light onto the entire substrate at weak intensity at room temperature again, as needed.

A polymer wall formation rate of the thus produced liquid crystal display device according to Example 5 for each column and each row is shown in Table 5 below. In Table 5, although only one-fourth of the liquid crystal cell is measured in this case, it is considered that the results can be applied to the remaining three-fourths.

TABLE 5

| | | Polymer wall formation rate (%) | | |
|---|---|---|---|---|
| | | Column | | |
| | | first to third | Fourth to tenth | 11th to 320th |
| Row | first to third | 30.2 | 50.7 | 65.8 |
| | fourth to tenth | 50.4 | 97.6 | 98.2 |
| | 11th to 120th | 67.2 | 97.8 | 98.8 |

As can be seen from Table 5 above, the polymer wall formation rate is low in pixels in 3 columns×3 rows (pixels from the outermost row and column to the pixel of the third column and third row). Therefore, if the pixels in at least 3 columns×3 rows are formed in the non-display section so as to be adjacent to the display section, poor formation of the polymer wall can be reduced over the entire display section A.

In Examples 1 through 5 described above, the liquid crystal display device which performs a display in a simple matrix driving method is described. However, the above-mentioned results can be applied to the liquid crystal display device which performs display in an active driving method using thin film transistors (TFTs) or metal insulator metal (MIM), and a driving method is not particularly limited. By changing the kind of the liquid crystal material injected into the liquid crystal cell and the kind of the alignment film, a liquid crystal display device which can be driven in a TN mode, a STN mode, a FLC mode or an ECB mode can be produced. Moreover, a liquid crystal display device utilizing a light scattering mode can be produced. Furthermore, by providing polarizers or reflectors on both surfaces of the liquid crystal cell, a transmission type or a reflection type liquid crystal display device can be produced. In addition, by forming a color filter or a black matrix, color display can also be performed.

As described above, according to the present invention, polymerization of a photopolymerizable compound is inhibited in the boundary region between the display section and the non-display section. Thus, since a stable polymerization reaction can be caused in the display section, the amount of polymer flowing from the display section to the non-display section, which conventionally occurs, can be reduced. As a result, it is ensured that polymer walls are formed at desired postions.

By providing a sealing material in the boundary region between the display section and the non-display section, the effect of preventing the polymer from flowing into the non-display section from the display section is obtained. In addition, the display medium (a liquid crystal material and a polymer) is present only in the display section. Thus, the amount of liquid crystal material and polymer to be used can be reduced.

Furthermore, by providing a double seal, resistance of the device against external pushing force can be enhanced so as to improve the reliability of the panel. In addition, by injecting a liquid crystal material between a gap between the double seals, the region can be used for display. Therefore, the substrates can be effectively used.

Furthermore, by making an irradiated area of the non-display section adjacent to the display section equal to that of the display section, a polymer wall formation rate in the display section can be increased. during use of such device, sufficient resistance against an external pushing force such as an input with a pen can be uniformly reserved in the entire panel.

As described above, a polymer wall formation rate in the display section can be increased. The poor formation of polymer walls, which conventionally occurs more in the periphery of the display section than in the central region due to difference in refractive index of light between the liquid crystal molecules and the polymer, can be reduced. As a result, display with reduced unevenness of color can be performed. At the same time, a required amount of liquid crystal material and polymer material can be reduced, and the substrates are effectively used. Thus, an industrially and commercially effective liquid crystal display device can be produced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: a pair of substrates, at least one of which is transparent; and a liquid crystal layer including a plurality of polymer walls and liquid crystal regions surrounded by the plurality of polymer walls and being interposed between the pair of substrates, wherein each substrate includes a display section having a plurality of electrodes for display at a side adjacent to the liquid crystal layer and a non-display section provided around the display section, and wherein a polymer wall formation rate in the peripheral region of the display section is 90% or more.

2. A liquid crystal display device according to claim 1, wherein a shielding layer for reducing the amount of UV ray to be transmitted is provided on at least one surface of at least one substrate in the non-display section.

3. A liquid crystal display device according to claim 1, wherein a sealing material is provided on a non-display section side in a boundary region between the display section and the non-display section.

4. A liquid crystal display device according to claim 3, wherein a width of the inner seal is the range of 50 µm to 2 mm.

5. A liquid crystal display device according to claim 3, wherein the sealing material has a double structure having an inner seal and an outer seal, the inner seal is provided in the boundary region between the display section and the non-display section, and the outer seal is provided in the non-display section.

6. A liquid crystal display device according to claim 5, wherein a liquid crystal material is injected between the inner seal and the outer seal.

7. A liquid crystal display device-according to claim 5, wherein a width of the inner seal is the range of 50 µm to 2 mm.

8. A liquid crystal display device according to claim 1, wherein a plurality of further electrodes having a shape similar to those formed in the display section are formed in the non-display section.

9. A liquid crystal display device according to claim 8, wherein the electrodes are formed in at least three pixel rows.

10. A method for producing a liquid crystal display device comprising the steps of:

attaching a pair of substrates, at least one of which is transparent, to each other, each substrate including a display section having a plurality of electrodes for display and a non-display section provided around the display section so that surfaces of the substrates on which the electrodes are respectively formed face each other;

sealing a mixture of a photopolymerizable composition and a liquid crystal material between the pair of substrates;

irradiating the mixture with light having different irradiation intensity between the display section and the non-display section and significantly varying irradiation intensity in the display section to photopolymerize the mixture so as to form polymer walls and liquid crystal regions.

11. A method according to claim 10, wherein a shielding layer for reducing the amount of UV light to be transmitted is provided on at least one surface of at least one substrate in the non-display section.

12. A method according to claim 10, wherein a sealing material is provided on the non-display section side in a boundary region between the display section and the non-display section.

13. A method according to claim 12, wherein the sealing material has a double structure having an inner seal and an outer seal, the inner seal is provided in the boundary region between the display section and the non-display section, and the outer seal is provided in the non-display section.

14. A method according to claim 13, wherein a width of the inner seal is the range of 50 μm to 2 mm.

15. A method according to claim 13, wherein a liquid crystal material is injected between the inner seal and the outer seal.

16. A method according to claim 15, wherein a width of the inner seal is the range of 50 μm to 2 mm.

17. A method according to claim 10, wherein a plurality of further electrodes having a shape similar to those formed in the display section are formed in the non-display section.

18. A method according to claim 17, wherein the electrodes are formed in at least three pixel rows.

\* \* \* \* \*